United States Patent [19]

Seed et al.

[11] 4,172,011
[45] Oct. 23, 1979

[54] LIQUID METAL COOLED NUCLEAR REACTOR CONSTRUCTIONS

[75] Inventors: Geoffrey Seed, St. Helens; Donald Hodgson, Ormskirk; Colin J. Grime, Warrington, all of England

[73] Assignee: Nuclear Power Company Limited, London, England

[21] Appl. No.: 824,227

[22] Filed: Aug. 12, 1977

[30] Foreign Application Priority Data

Aug. 12, 1976 [GB] United Kingdom ............... 33673/76

[51] Int. Cl.$^2$ ............................................. G21C 13/10
[52] U.S. Cl. ...................................... 176/87; 176/40; 176/65
[58] Field of Search ............................. 176/40, 65, 87

[56] References Cited

U.S. PATENT DOCUMENTS

| 3,548,931 | 12/1970 | Germer et al. | 176/40 X |
|---|---|---|---|
| 3,926,722 | 12/1975 | Dupen | 176/87 |
| 3,987,860 | 10/1976 | Jabsen | 176/87 |
| 4,022,658 | 5/1977 | Gama et al. | 176/87 X |
| 4,024,018 | 5/1977 | Barnes | 176/40 X |
| 4,028,177 | 6/1977 | Failla et al. | 176/87 X |
| 4,056,438 | 11/1977 | Gama et al. | 176/50 |

*Primary Examiner*—Peter A. Nelson
*Attorney, Agent, or Firm*—Larson, Taylor and Hinds

[57] ABSTRACT

The primary vessel of a pool type fast reactor is open at its upper end and is suspended from the roof of the vault by ties. The vessel is enclosed within a fluid tight leak jacket containing an inert cover gas for the pool of coolant.

Because of the unrestrained open end of the vessel severe stress concentrations in the upper strake are avoided. The problem does not occur in the leak jacket because the cover gas, supplemented by thermal insulation cladding and cooling coils, avoids excessive temperature differentials.

3 Claims, 5 Drawing Figures

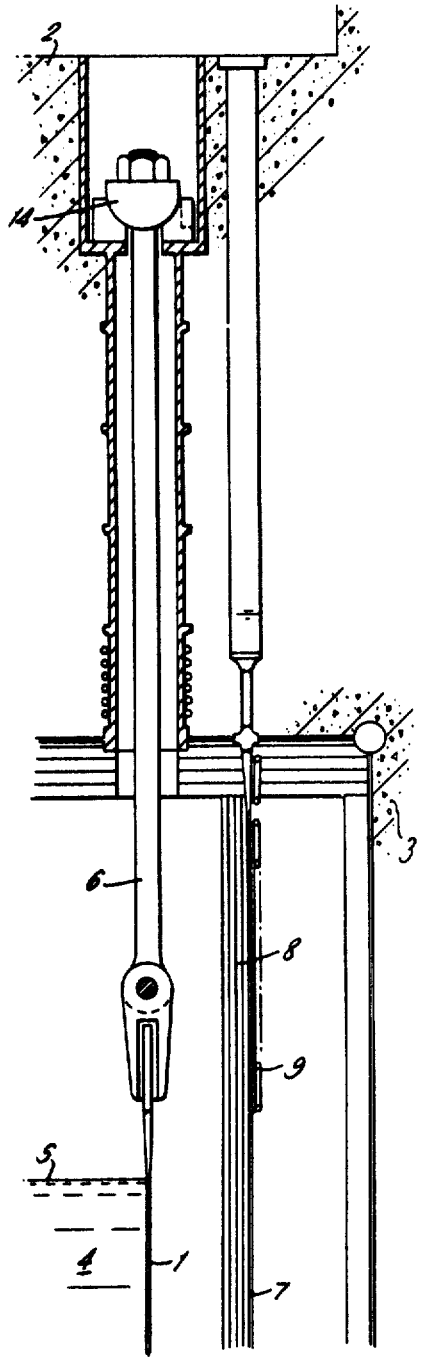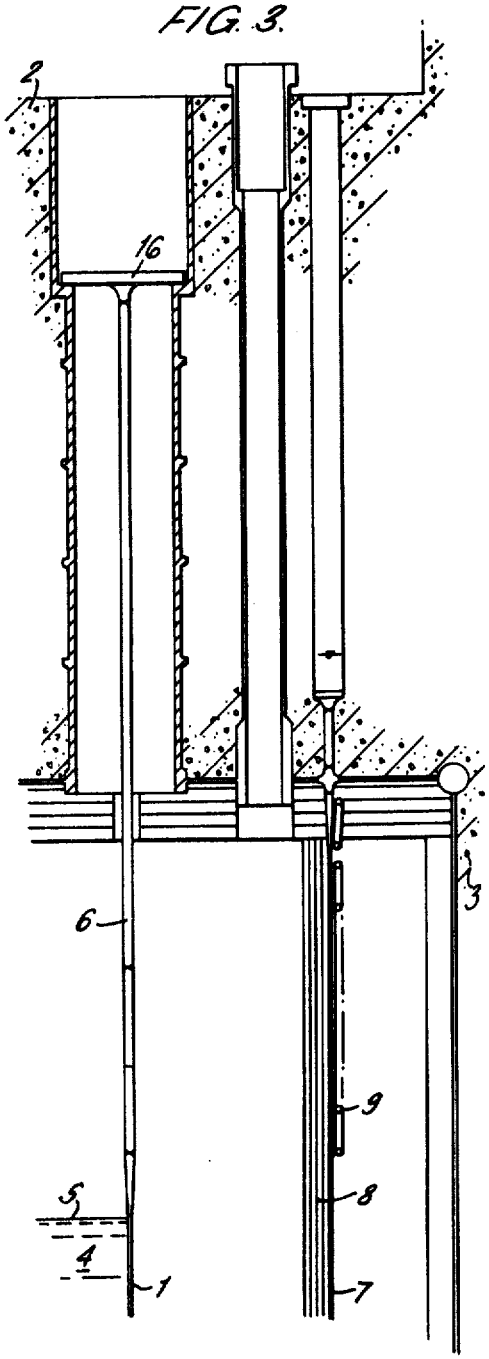

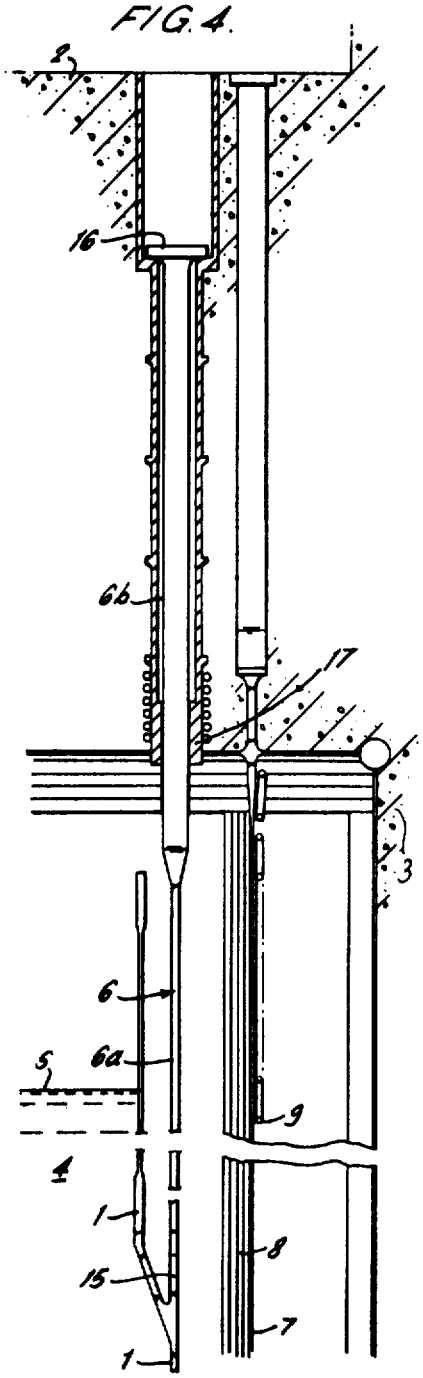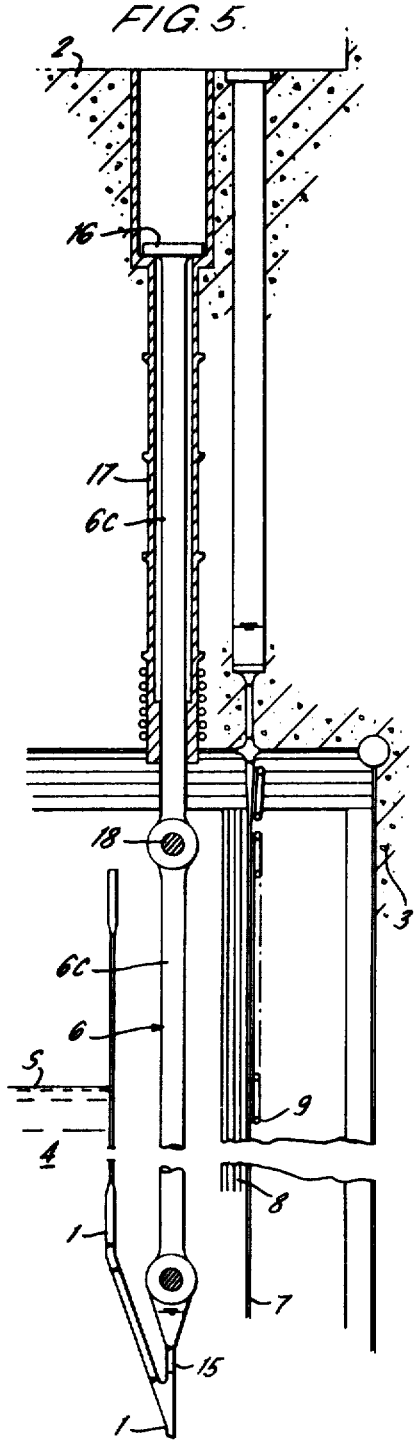

LIQUID METAL COOLED NUCLEAR REACTOR CONSTRUCTIONS

BACKGROUND OF THE INVENTION

This invention relates to liquid metal cooled nuclear reactor constructions.

One known example of liquid metal cooled nuclear reactor construction comprises a primary vessel suspended from the roof of a containment vault, the primary vessel containing a pool of coolant in which the reactor core is submerged. The primary vessel is sealed at its rim to the roof of the vault and contains an inert cover gas for the pool of coolant. A leak jacket or catchpot enveloping the primary vessel is also suspended from the roof and serves to catch coolant in the event of a leak from the primary vessel.

When the reactor is in operation the temperature of the concrete at the underside of the roof is approximately 40° C. whilst the temperature of the coolant in contact with the wall of the primary vessel is approximately 400° C. so there is a large temperature differential over the upper strakes of the primary vessel. This temperature differential creates a stress problem in the primary vessel and at its sealed connection with the roof of the vault.

In U.S. Pat. No. 4,022,656 means for alleviating this stress problem is disclosed. The means comprises a cooling jacket and thermal insulation cladding an upper region of the primary vessel and arranged progressively to reduce the temperature of the vessel wall towards the roof of the vault.

An object of the present invention is to modify the reactor construction in such a manner that complex stresses in the wall of the primary vessel are largely avoided.

SUMMARY OF THE INVENTION

According to the invention in a liquid metal cooled nuclear reactor construction comprising a primary vessel suspended from the roof of a concrete containment vault, the primary vessel containing a pool of coolant in which the reactor core is submerged, the primary vessel has an open upper end and is suspended from the roof by ties, the primary vessel and ties being enveloped by a fluid tight leak jacket which is sealed to the roof of the vault at its rim and in which there is an inert cover gas for the pool of coolant. In a construction according to the invention there is no circumferential restraint at the attachment of the primary vessel to the roof structure so hoop stresses at the rim are avoided. The leak jacket is not in contact with the coolant and being cooled by cover gas in contact with practically all of its internal surface, is not subject to the severe temperature differential between the surface of the pool and the roof of the vault. If desired a circumferential upper region of the leak jacket may be lined internally with thermal insulation to reduce heat transfer by radiation from the pool of coolant and may be cooled externally. In a preferred construction the ties comprise rods or straps pivoted or welded to an inverted skirt attached externally to the primary vessel at a level below the surface level of the pool of coolant.

DESCRIPTION OF THE DRAWINGS

Constructions of liquid metal cooled nuclear reactor embodying the invention are described, by way of example only, with reference to the accompanying drawings wherein:

FIGS. 2, 3, 4 and 5 are fragmentary sectional views of alternative features of the construction.

DESCRIPTION OF THE PREFERRED EMBODIMENT

Figure 1:
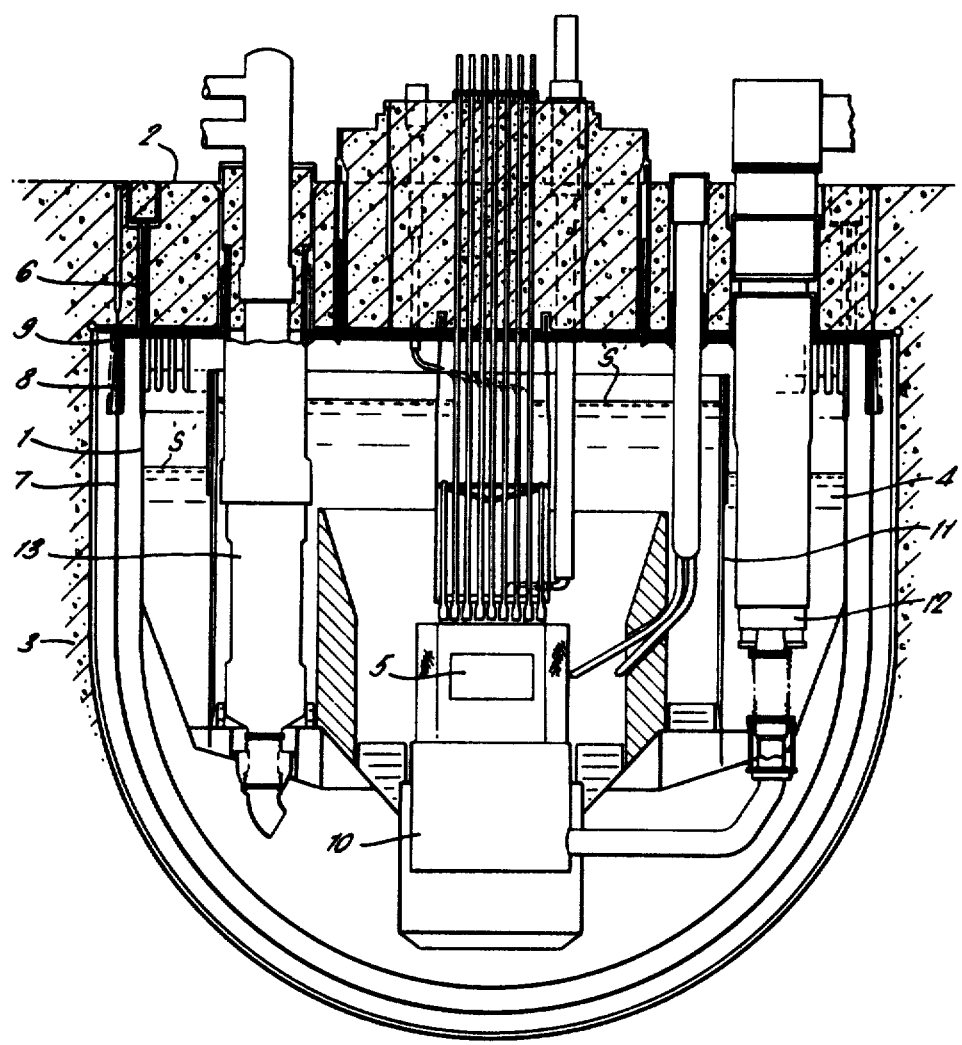
FIG. 1 is a sectional view of a construction.

In FIG. 1 there is shown a liquid metal cooled nuclear reactor construction comprising a primary vessel 1 suspended from the roof 2 of a containment vault 3. The primary vessel 1 contains a pool 4 of coolant (having dynamic surfaces designated 'S') in which a reactor core 5 is submerged. The primary vessel 1 has an open upper end and is suspended from the roof 2 by ties 6 disposed about its periphery. The primary vessel 1 and ties 6 are enveloped by a fluid tight leak jacket 7 or catchpot which is sealed at its rim to the roof 2 of the vault. The leak jacket 7 contains an inert cover gas for the coolant. The upper regions of the leak jacket are lined internally with thermal insulation 8 and there is cooling means 9 comprising fluid conducting cooling coils on the outer surface.

In more detail, the nuclear reactor core 5 is a fast breeder reactor comprising a plurality of upstanding fuel element assemblies arranged side-by-side on a diagrid 10. The core 5 is surrounded by a shroud 11 and a pump 12 is arranged to flow coolant drawn from the outer regions of the pool through the core by way of the diagrid. The coolant is heated in passage through the core and flows upwardly through the shroud 11 thence outwardly to a heat exchanger 13 subsequently being returned to the outer regions of the pool. The temperature of the coolant within the shroud is approximately 600° C. whilst the temperature of the coolant outside the shroud is approximately 400° C.

There are fifty ties 6 equally spaced about the periphery of the primary vessel 1 and, as shown in FIG. 2, each tie comprises a rod pivotably connected to the vessel. The upper ends of the ties are supported in the roof 2 of the containment vault in part spherical bearings 14. Thus the ties 6 are freely pivotable at each end thereby avoiding complex stresses due to thermal expansion of the vessel and ties. Complex hoop stresses in the primary vessel are also avoided, because the rim of the primary vessel is unrestrained. The inert cover gas is in contact with almost all the inner surface of the leak jacket and the effect, together with the internal insulation 8 and external cooling 9 of the leak jacket, prevents the occurence of a large temperature differential in the upper regions of the leak jacket thereby avoiding complex stresses being created in the leak jacket and its attachment to the roof of the containment.

In an alternative construction shown in FIG. 3 the ties 6 comprise straps welded to the rim of the primary vessel and supported by a flange 16 in the roof of the containment. The straps are able to flex to accommodate any movements due to thermal expansion of the primary vessel.

In the construction shown in FIG. 4 the ties 6 are composite and each comprises a strap 6a extended upwardly by a rod 6b of circular section. The straps are attached to an inverted skirt 15 disposed at a level below the level of the pool surface (designated S) whilst the upper ends of the rods have flanges 16 from which the ties are suspended from the roof structure. The rods are slidably guided by tubes 17 to prevent pivoting at their upper ends.

In the construction shown in FIG. 5 the ties 6 each comprise a pair of rods 6c interconnected end-to-end by a pivot 18. The pairs of rods 6c are pivotably connected at their lower ends to an inverted skirt 15 of the primary vessel disposed at a level below the surface level 5 of the pool 4 of coolant. The upper ends of the pairs of rods 6c are supported in the roof structure by flanges 16 and there is a tubular guide 17 for each of the upper rods to prevent them pivoting at their upper ends.

In an alternative construction each tie (which may be of any of the described alternative kinds) is suspended from the roof structure by jacking means whereby the level of each connection with the primary tank can be adjusted.

We claim:

1. A liquid metal cooled nuclear reactor construction comprising:

a concrete containment vault, a primary vessel housed within the vault, said primary vessel having an open top, a nuclear reactor core submerged in a pool of coolant contained within the primary vessel, a fluid tight leak jacket enveloping the primary vessel and sealed to the roof of the vault at its rim, the leak jacket containing an inert cover gas for the pool of coolant, and an annular series of ties suspending the primary vessel from the roof of the vault, said ties being connected to an inverted skirt attached externally to the primary vessel, the connections being disposed below the level of the surface of the pool of coolant.

2. A liquid metal cooled nuclear reactor construction according to claim 1 wherein the ties comprise straps which are welded to the inverted skirt of the primary vessel and are carried at their upper ends in the roof structure of the vault by flanges.

3. A liquid metal cooled nuclear reactor construction according to claim 1 wherein the ties each comprise a pair of rods interconnected end-to-end by a pivot, the pairs of rods being pivotably connected to the inverted skirt of the primary vessel and carried in a non pivotable manner at their upper ends in the roof structure of the vault.

* * * * *